(12) United States Patent  
Li

(10) Patent No.: US 11,216,207 B2  
(45) Date of Patent: Jan. 4, 2022

(54) APPARATUS AND METHOD FOR PROGRAMMING USER DATA ON THE PAGES AND THE PARITY OF THE PAGE GROUP INTO FLASH MODULES

(71) Applicant: Silicon Motion, Inc., Zhubei (TW)

(72) Inventor: An-Pang Li, New Taipei (TW)

(73) Assignee: SILICON MOTION, INC., Hsinchu County (TW)

( * ) Notice: Subject to any disclaimer, the term of this patent is extended or adjusted under 35 U.S.C. 154(b) by 0 days.

(21) Appl. No.: 17/010,420

(22) Filed: Sep. 2, 2020

(65) Prior Publication Data

US 2021/0181972 A1 Jun. 17, 2021

Related U.S. Application Data

(60) Provisional application No. 62/948,516, filed on Dec. 16, 2019.

(30) Foreign Application Priority Data

Apr. 8, 2020 (CN) .......................... 202010267832.5

(51) Int. Cl.
*G06F 3/06* (2006.01)
*G06F 13/28* (2006.01)

(52) U.S. Cl.
CPC ............ *G06F 3/0655* (2013.01); *G06F 3/061* (2013.01); *G06F 3/0679* (2013.01); *G06F 13/28* (2013.01); *G06F 2213/28* (2013.01)

(58) Field of Classification Search
CPC ...... G06F 3/0655; G06F 3/061; G06F 3/0679; G06F 13/28
See application file for complete search history.

(56) References Cited

U.S. PATENT DOCUMENTS 8,583,868 B2 * 11/2013 Belluomini ......... G06F 12/0866
711/114
9,021,343 B1 4/2015 Hu et al.
(Continued)

OTHER PUBLICATIONS

English Translation of Taiwanese Search Report issued in Taiwan Application No. 109111754, dated Jul. 29, 2020.

*Primary Examiner* — Tammara R Peyton
(74) *Attorney, Agent, or Firm* — Birch, Stewart, Kolasch & Birch, LLP

(57) ABSTRACT

The invention introduces a method for programming data of page groups into flash units to include steps for: obtaining, by a host interface (I/F) controller, user data of a page group from a host side, wherein the page group comprises multiple pages; storing, by the host I/F controller, the user data on the pages in a random access memory (RAM) through a bus architecture, outputting the user data on the pages to an engine via an I/F, and enabling the engine to calculate a parity of the page group according to the user data on the pages; obtaining, by a direct memory access (DMA) controller, the parity of the page group from the engine and storing the parity of the page group in the RAM through the bus architecture; and obtaining, by a flash I/F controller, the user data on the pages and the parity of the page group from the RAM through the bus architecture, and programming the user data on the pages and the parity of the page group into a flash module.

20 Claims, 9 Drawing Sheets

(56) References Cited

U.S. PATENT DOCUMENTS

| | | | |
|---|---|---|---|
| 2009/0210620 A1* | 8/2009 | Jibbe | G06F 11/108 711/114 |
| 2010/0017650 A1* | 1/2010 | Chin | G06F 11/108 714/6.12 |
| 2019/0173492 A1 | 6/2019 | Yang et al. | |
| 2020/0081780 A1* | 3/2020 | Li | G06F 3/0689 |

* cited by examiner

| | |
|---|---|
| P#0 | ECC#0 |
| P#1 | ECC#1 |
| P#2 | ECC#2 |
| P#3 | ECC#3 |
| P#4 | ECC#4 |
| P#5 | ECC#5 |
| P#6 | ECC#6 |
| Parity Page | ECC(Parity) |

FIG. 1

APPARATUS AND METHOD FOR PROGRAMMING USER DATA ON THE PAGES AND THE PARITY OF THE PAGE GROUP INTO FLASH MODULES

CROSS-REFERENCE TO RELATED APPLICATIONS

This application claims the benefit of priority to U.S. Provisional Application Ser. No. 62/948,516, filed on Dec. 16, 2019; and Patent Application No. 202010267832.5, filed in China on Apr. 8, 2020; the entirety of which is incorporated herein by reference for all purposes.

BACKGROUND

The disclosure generally relates to storage devices and, more particularly, to apparatuses and methods for programming data of page groups into flash units.

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation).

A flash controller typically employs error correcting code (ECC) to correct error bits in user data over channels or in memory cells. The flash controller encodes the user data with redundant information in the form an ECC in data writes. The redundancy allows the flash controller to correct a limited number of error bits that may occur anywhere in the user data in data reads. To prevent a critical error of user data pages including too many error bits that cannot be recovered, the flash controller sets a predetermined number of pages to form a page group, and generates parities according to the user data pages of the page group. However, it spends lots of time and computation resources to calculates parities across data pages of a page group. Thus, it is desirable to have apparatuses and methods for programming data of page groups into flash units to reduce time and computation resources for calculating parities of page groups.

SUMMARY

In an aspect of the invention, an embodiment of a method for programming data of page groups into flash units is introduced to include steps for: obtaining, by a host interface (I/F) controller, user data of a page group from a host side, wherein the page group comprises multiple pages; storing, by the host I/F controller, the user data on the pages in a random access memory (RAM) through a bus architecture, outputting the user data on the pages to an engine via an I/F, and enabling the engine to calculate a parity of the page group according to the user data on the pages; obtaining, by a direct memory access (DMA) controller, the parity of the page group from the engine and storing the parity of the page group in the RAM through the bus architecture; and obtaining, by a flash I/F controller, the user data on the pages and the parity of the page group from the RAM through the bus architecture, and programming the user data on the pages and the parity of the page group into a flash module.

In another aspect of the invention, an embodiment of an apparatus for programming data of page groups into flash units is introduced to include: a bus architecture; an engine; and a host I/F controller. The host I/F controller includes a first I/F coupled to the bus architecture, a second I/F coupled to a host side, a third I/F coupled to the engine, and a controller coupled to the first, the second and the third I/Fs. The controller is arranged operably to drive the second I/F to obtain user data of a page group from the host side, which includes multiple pages; and drive the first I/F to store the user data on the pages in a random access memory (RAM) through the bus architecture, drive the third I/F to output the user data on the pages to the engine, and enable the engine to calculate a parity of the page group according to the user data on the pages.

Both the foregoing general description and the following detailed description are examples and explanatory only, and are not restrictive of the invention as claimed.

BRIEF DESCRIPTION OF THE DRAWINGS

FIG. 1 is a schematic diagram illustrating logical data organization of data pages, parity page and Error Correcting Code (ECC).

DETAILED DESCRIPTION

Figure 2:
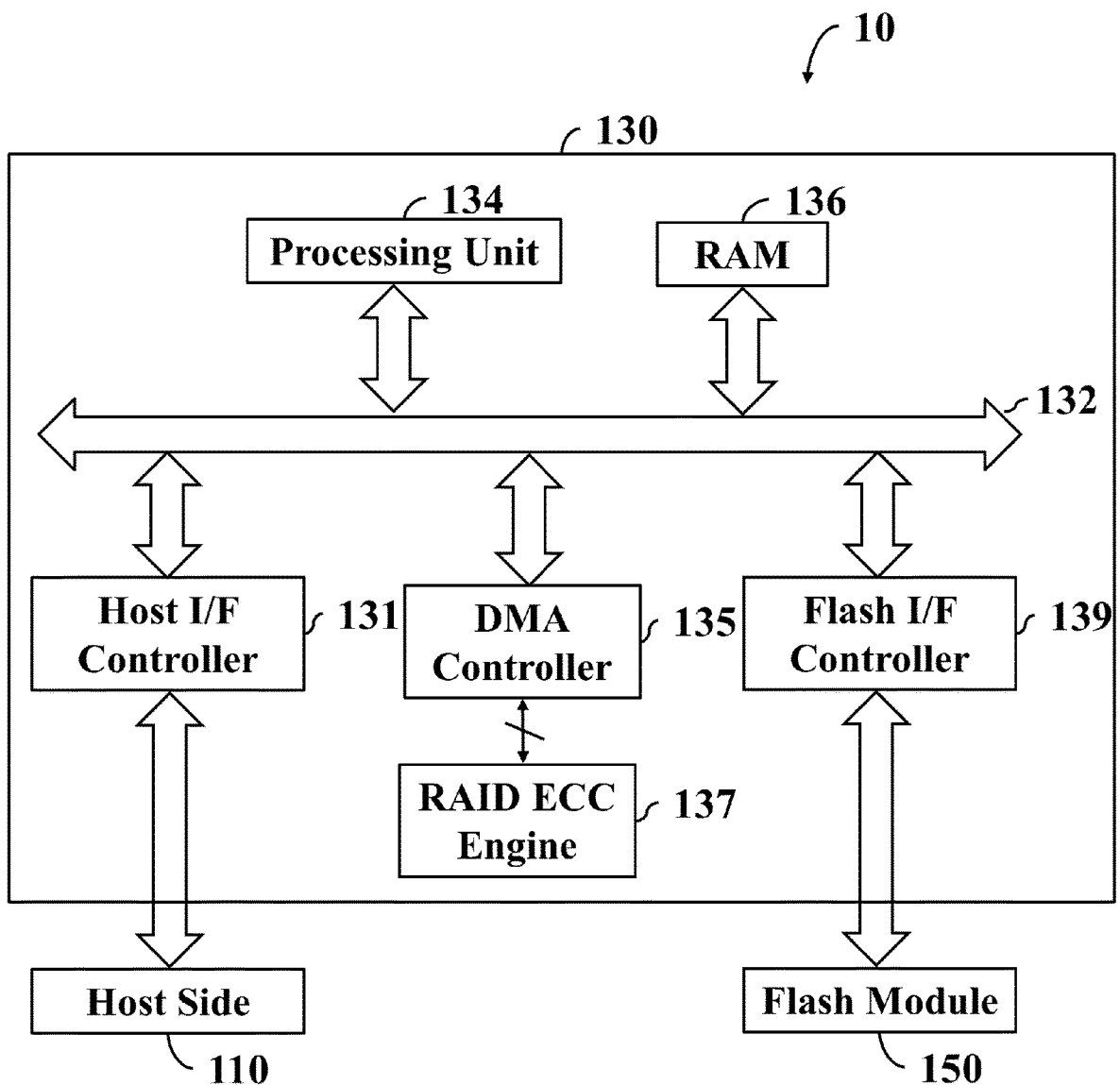
FIG. 2 is the system architecture of an electronic apparatus according to some implementations.

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

To reach the fault tolerance of user data, a flash controller may generate error correcting code (ECC) according to user data of each page, and program the user data together with the ECC into a flash module, so that in the future, user data containing error bits read from the flash module can be corrected. The ECC may be Low-Density Parity Check Code (LDPC), Bose-Chaudhuri-Hocquenghem Code (BCH), or others. Taking 1 KB user data as an example, BCH code can be used to correct at most 72 error bits while LDPC can be used to correct at most 128 error bits. However, the user data of the read page may contain more error bits than that can be corrected with the ECC. Therefore, the flash controller may set a predetermined number of pages to form a page group and generates a parity page according to the user data of the page group. Refer to the exemplary data organization as shown in FIG. 1. Pages P #0 to P #6 form a page group. Each page contains 4096 bytes of user data and ECC generated from the user data. For example, the notation ECC #0 stands for the ECC of the page P #0, the notation ECC #1 stands for the ECC of the page P #1, and so on. It is to be understood that the examples of FIG. 1 show the perspective of logical representation, the invention should not be limited to physically store user data pages with their ECC, and parity page with its ECC of one page group in the same physical block of a flash module. To optimize the overall system performance, user data pages with their ECC, and parity page with its ECC of one page group may be distributed to store in physical blocks of Logical Number Units (LUNs) in different channels parallelly, and the invention should not be limited thereto. Data of the parity page may be generated by Equation 1:

$$P_j = d_{p0,j} \oplus d_{p1,j} \oplus d_{p2,j} \oplus d_{p3,j} \oplus d_{p4,j} \oplus d_{p5,j} \oplus d_{p6,j}$$

where j is an arbitrary integer ranging from 0 to 4095, p0 represents the $0^{th}$ page, p1 represents the $1^{st}$ page, p2 represents the $2^{nd}$ page, and so on, Pj represents the jth data bit of the parity page, $d_{p0,j}$ represents the $j^{th}$ data bit of the $0^{th}$ page, $d_{p1,j}$ represents the $j^{th}$ data bit of the $1^{st}$ page, $d_{p2,j}$ represents the $j^{th}$ data bit of the $2^{nd}$ page, and so on. If error bits of one page cannot be corrected with the corresponding ECC, then the flash controller may omit this page and generate the corrected user data of this page by applying XOR operations on data bits of the other pages and the parity page of the same page group. Suppose that the error bits of the $1^{st}$ page cannot be corrected with the corresponding ECC, data bits of the error page may be recovered by Equation 2:

$$d_{p1,j} = d_{p0,j} \oplus d_{p2,j} \oplus d_{p3,j} \oplus d_{p4,j} \oplus d_{p5,j} \oplus d_{p6,j} \oplus P_j$$

The parity of a page group may also be referred to as Redundant Array of Independent Disks (RAID) ECC according to its functions.

To achieve the aforementioned two-dimensional protection, FIG. 2 shows the system architecture in some implementations. The electronic apparatus 100 includes a host side 110, a flash controller 130 and a flash module 150, and the flash controller 130 and the flash module 150 may be collectively referred to as a device side. The electronic apparatus 100 may be equipped with a Personal Computer (PC), a laptop PC, a tablet PC, a mobile phone, a digital camera, a digital recorder, or other consumer electronic products. The host side 110 may communicate with a host interface (I/F) controller 131 of the flash controller 130 each other over Universal Serial Bus (USB), Advanced Technology Attachment (ATA), Serial Advanced Technology Attachment (SATA), Peripheral Component Interconnect Express (PCI-E), Universal Flash Storage (UFS), Embedded Multi-Media Card (eMMC) interface, or others with a relevant protocol. A flash interface (I/F) controller 139 of the flash controller 130, and the flash module 150 may communicate with each other by a Double Data Rate (DDR) protocol, such as Open NAND Flash Interface (ONFI), DDR Toggle, or others. The flash controller 130 includes a processing unit 134, and the processing unit 134 may be implemented in numerous ways, such as with general-purpose hardware (e.g., a single processor, multiple processors or graphics processing units capable of parallel computations, or others) that is programmed using firmware and/or software instructions to perform the functions recited herein. The processing unit 134 receives host commands, such as read commands, write commands, erase commands, etc. through the host interface controller 131, schedules and executes the commands. The flash controller 130 additionally includes Random Access Memory (RAM) 136, such as a Dynamic Random Access Memory (DRAM), a Static Random Access Memory (SRAM), or the combination thereof, for allocating space as a data buffer for storing user data (also referred to as host data) on pages that is read from the host side 100 and to be written into the flash module 150, and parity bits (also referred to as a parity) of a page group. The RAM additionally allocates space for storing user data on pages that is read from the flash module 150 and to be output to the host side 110, and storing ECC and parity bits that are read from the flash module 150 and used in a data correction process. The RAM 136 may additionally store necessary data in execution, such as variables, data tables, data abstracts, host-to-flash (H2F) tables, flash-to-host (F2H) tables, or others. The flash interface controller 139 includes a NAND flash controller (NFC) to provide functions that are required to access to the flash module 150, such as a command sequencer, an ECC encoder, an ECC decoder, etc. The ECC encoder is used to generate ECC according to the content of one user-data page or one RAID ECC page.

The flash controller 130 may be equipped with the bus architecture 132, which is used to couple components to each other to transmit data, addresses, control signals, etc. The components include the host I/F controller 131, the processing unit 134, the RAM 136, a Direct Memory Access (DMA) controller 135, the flash I/F controller 139, and others. In some embodiments, the host I/F controller 131, the processing unit 134, the RAM 136, the DMA controller 135, the flash I/F controller 139, and others may be coupled to each other by a single bus. In alternative embodiments, the flash controller 130 may be equipped with a high-speed bus, which is used to couple the processing unit 134, the DMA controller 135 and the RAM to each other, and a low-speed bus, which is used to couple the processing unit 134, the DMA controller 135, the host I/F controller 131 and the flash I/F controller 139 to each other. The bus includes a set of parallel physical-wires connected to two or more components of the flash controller 130. The bus is a shared transmission medium so that only two components can access to the wires to communicate with each other for transmitting data at any one time. Data and control signals travel in both directions between the components along data and control lines, respectively. Addresses on the other hand travel only one way along address lines. For example, when the processing unit 134 wishes to read data from a particular address of the RAM 136, the processing unit 134 sends this address to the RAM 136 on the address lines. The data of that address is then returned to the processing unit 134 on the data lines. To complete the data read operation, control signals are sent along the control lines.

The flash controller 130 may contain the RAID ECC engine 137 including XOR gates and registers for performing the calculations of the above Equations 1 and 2, and the like. The DMA controller 135 may contain an instruction queue. The processing unit 134 may issue a data-access instruction to the DMA controller 135 through the bus architecture 132 and the DMA controller 135 stores the instructions in the instruction queue in the order of their arrival times. Each data-access instruction may include information, such as a source component, a source address, a destination component, a destination address, and so on. The DMA controller 135 moves designated data through the bus architecture 132 according to the data-access instructions. For example, the DMA controller 135 reads a specified length of data from a designated address of the RAM 136 and feeds the data into the RAID ECC engine 137, stores parities generated by the RAID ECC engine 137 in a designated address of the RAM 136, or others.

The flash module 150 provides huge storage space typically in hundred Gigabytes, or even several Terabytes, for storing a wide range of user data, such as high-resolution images, video files, etc. The flash module 150 includes control circuits and memory arrays containing memory cells, such as Single Level Cells (SLCs), Multi-Level Cells (MLCs), Triple Level Cells (TLCs), Quad-Level Cells (QLCs), or any combinations thereof. The processing unit 134 programs user data, ECC, parities or any combinations thereof into a designated address (a destination address) of the flash module 150 and reads user data, ECC, parities or any combinations thereof from a designated address (a source address) of the flash module 150 through the flash I/F controller 139. The flash I/F controller 139 may use several electronic signals including a data line, a clock signal line and control signal lines for coordinating the command, address and data transfer with the flash module 150. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 3:
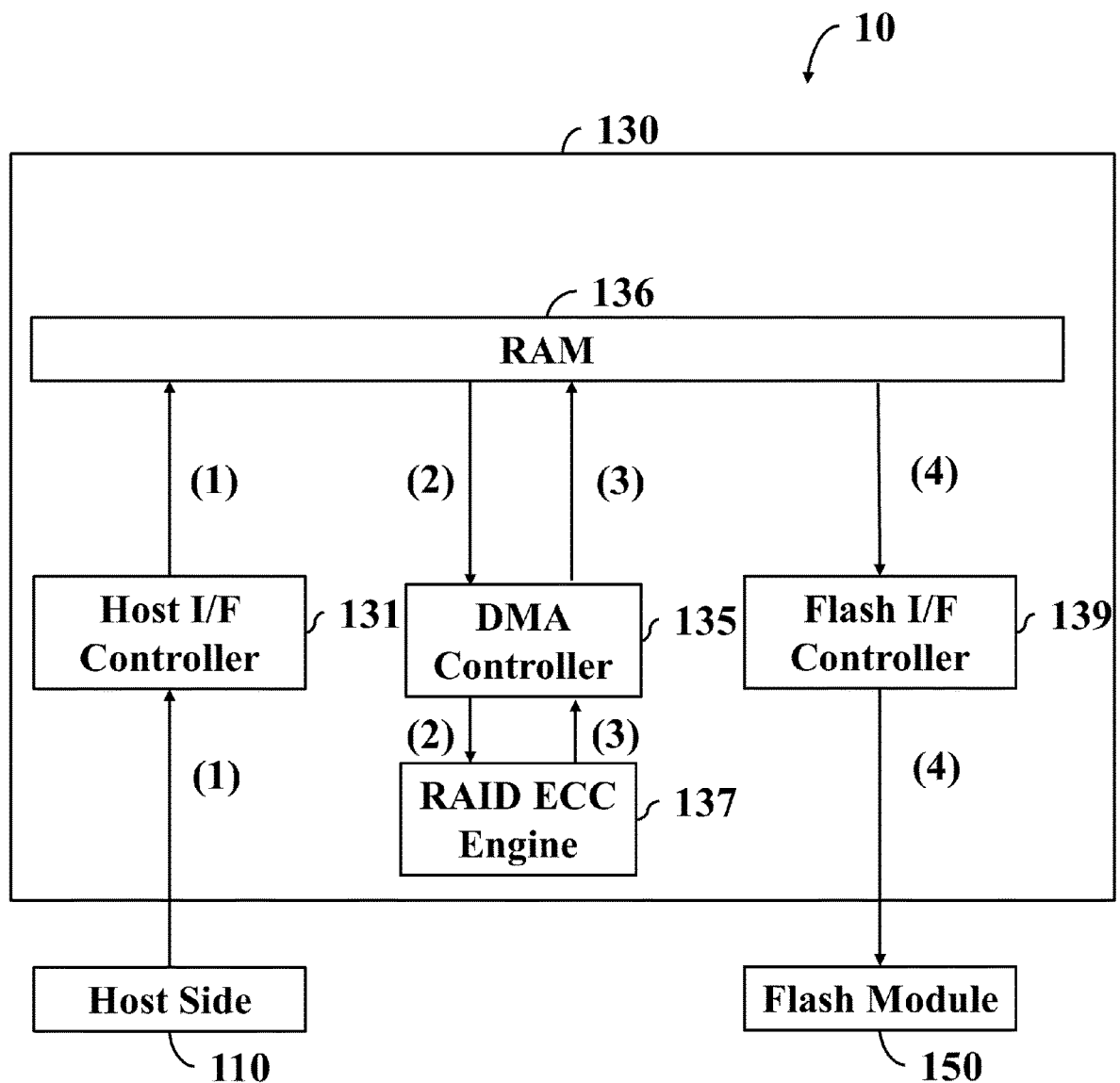
FIG. 3 is a schematic diagram for generating and programming user data and parity bits of a page group based on the system architecture as shown in FIG. 2.

However, the above architecture would cause the DMA controller 135 to wait for the host I/F controller 131 to store a page of user data to a specified address of the RAM 136 before being able to read the user data on this page from the specified address of the RAM 136 and output the read one to the RAID ECC engine 137. Specifically, refer to steps as shown in FIG. 3.

Step (1): The host I/F controller 131 obtains one page of user data from the host side 110 and stores the user data on this page in a specified address of the RAM 136.

Step (2): The DMA controller 135 reads one page of user data from the specified address of the RAM 136 and outputs the read one to the RAID ECC engine 137. Steps (1) and (2) are repeatedly executed in the flash controller 130 until the user data of a page group is input to the RAID ECC engine 137 completely for calculation.

Step (3): The DAM controller 135 obtains parity bits of this page group from the RAID ECC engine 137 and stores the obtained one in a specified address of the RAM 136.

Step (4): The flash I/F controller 139 reads user data on these pages and parity bits of this page group from the specified addresses of the RAM 136 and program the read ones into the flash module 150.

Figure 4:
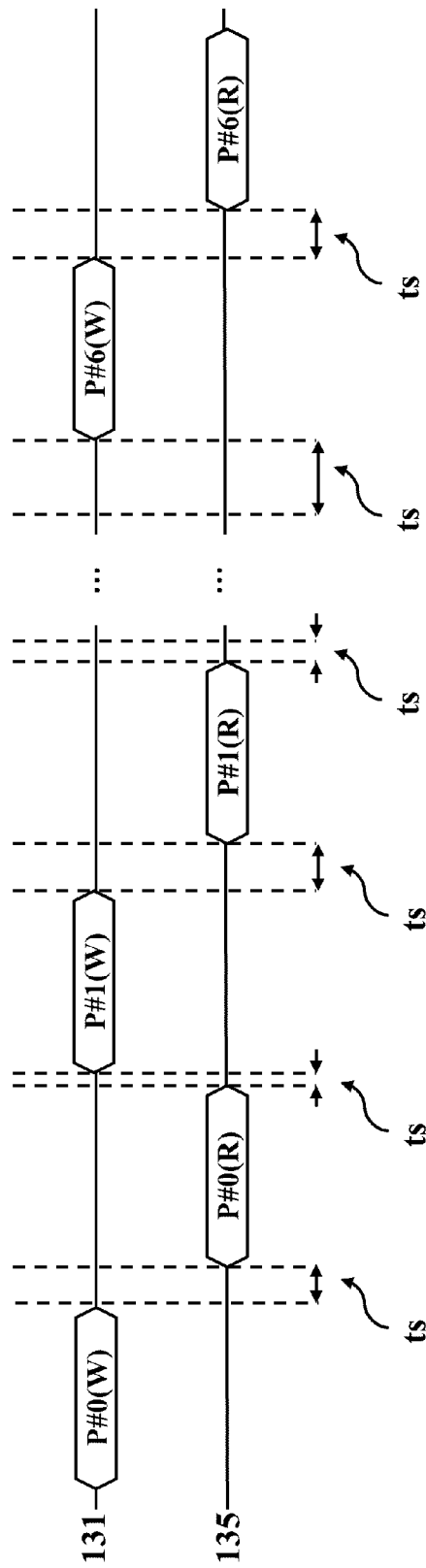
FIG. 4 shows an operation sequence based on the process steps as shown in FIG. 3.

The executions of steps (1) and (2) need to wait for each other, prolonging the time for programming data. Refer to FIG. 4. For example, the operation P #1(W) by the host I/F controller 131 for storing user data on the $1^{st}$ page in the RAM 136 needs to wait for the DMA controller 135 to perform the operation P #0(R) for reading user data on the $0^{th}$ page from the RAM 136, the operation P #1(R) by the DMA controller 135 for reading user data on the $1^{st}$ page from the RAM 136 needs to wait for the host I/F controller 131 to perform the operation P #1(W) to store user data on the 1st page in the RAM 136, and so on. Moreover, since the host I/F controller 131 and the DMA controller 135 need to contend for the control of the bus architecture 132, the lead time (as shown in the time interval is of FIG. 4) between steps (1) and (2) may be extended when other component, such as, the processing unit 134, the flash I/F controller 139, etc., occupies the bus architecture 132.

Figure 5:
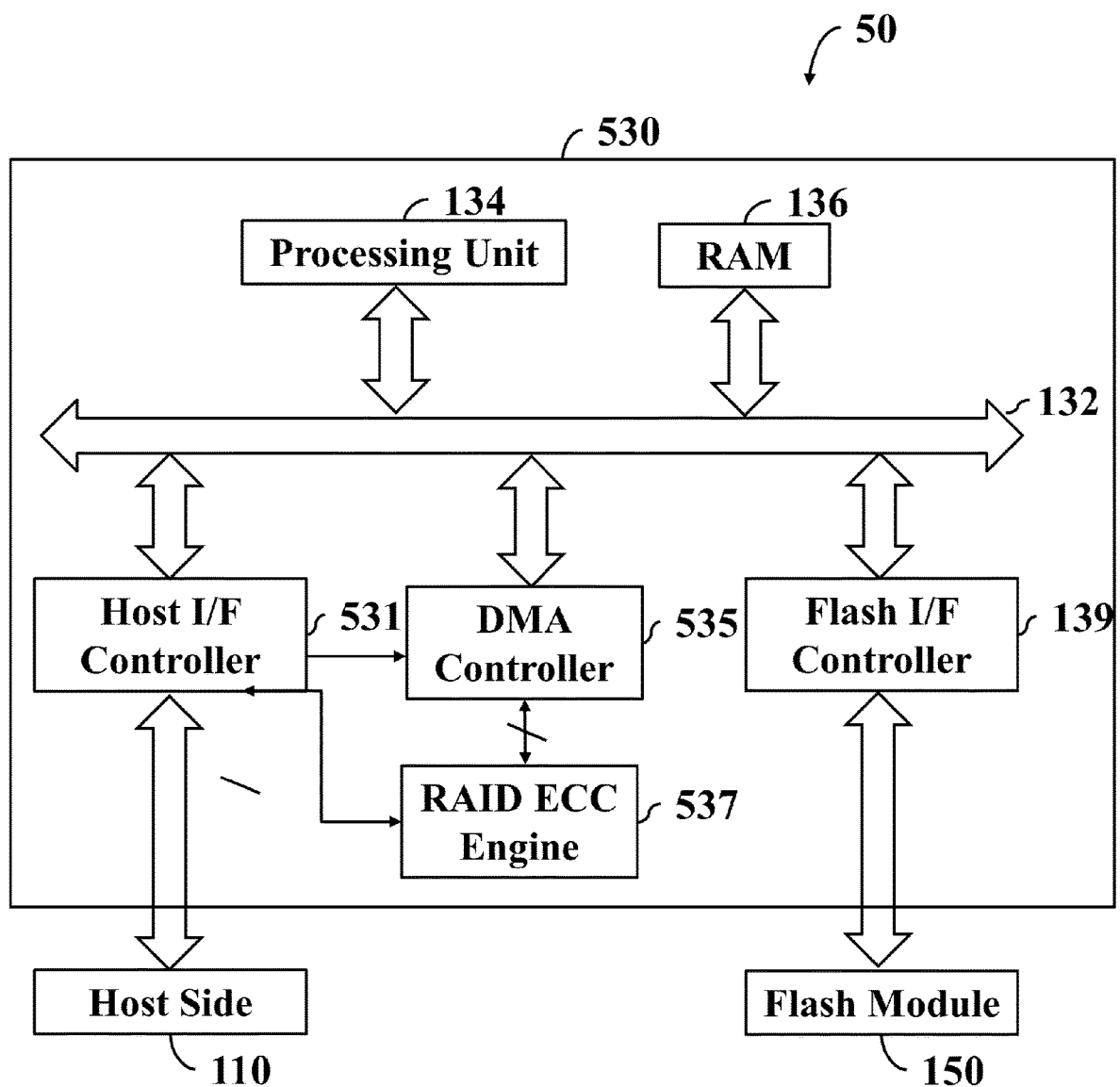
FIG. 5 is the system architecture of an electronic apparatus according to an embodiment of the invention.

To address the aforementioned problems occurred in the aforementioned implementations, an embodiment of the invention introduces a new flash controller including modified interface settings between the host I/F controller 131, the DMA controller 135 and the RAID ECC engine 137 to prevent the DMA controller 135 from occupying the bus architecture 132 to read user data of a page group from the RAM 136 and output the read one the RAID ECC engine 137. Refer to an electronic apparatus 50 as shown in FIG. 5. The host I/F controller 531 and the RAID ECC engine 537 add interconnected interfaces, so that, after obtaining one page of user data from the host side 110, the host I/F controller 531 not only stores user data on this page in a specified address of the RAM 136 through the bus architecture 132, but also simultaneously transmits the user data on this page to the RAID ECC engine 537 through the newly added interface. After transmitting user data of one page group to the RAID ECC engine 537 completely, the host I/F controller 531 sends a control signal to the DMA controller 535, so that the DMA controller 535 obtains parity bits of this page group from the RAID ECC engine 537 and stores the parity bits in a specified address of the RAM 136 through the bus architecture 132. The bus architecture 132 is shared by the RAM 136, the host I/F controller 531, the DMA controller 535 and the flash I/F controller 139 to transfer data therebetween.

Figure 6:
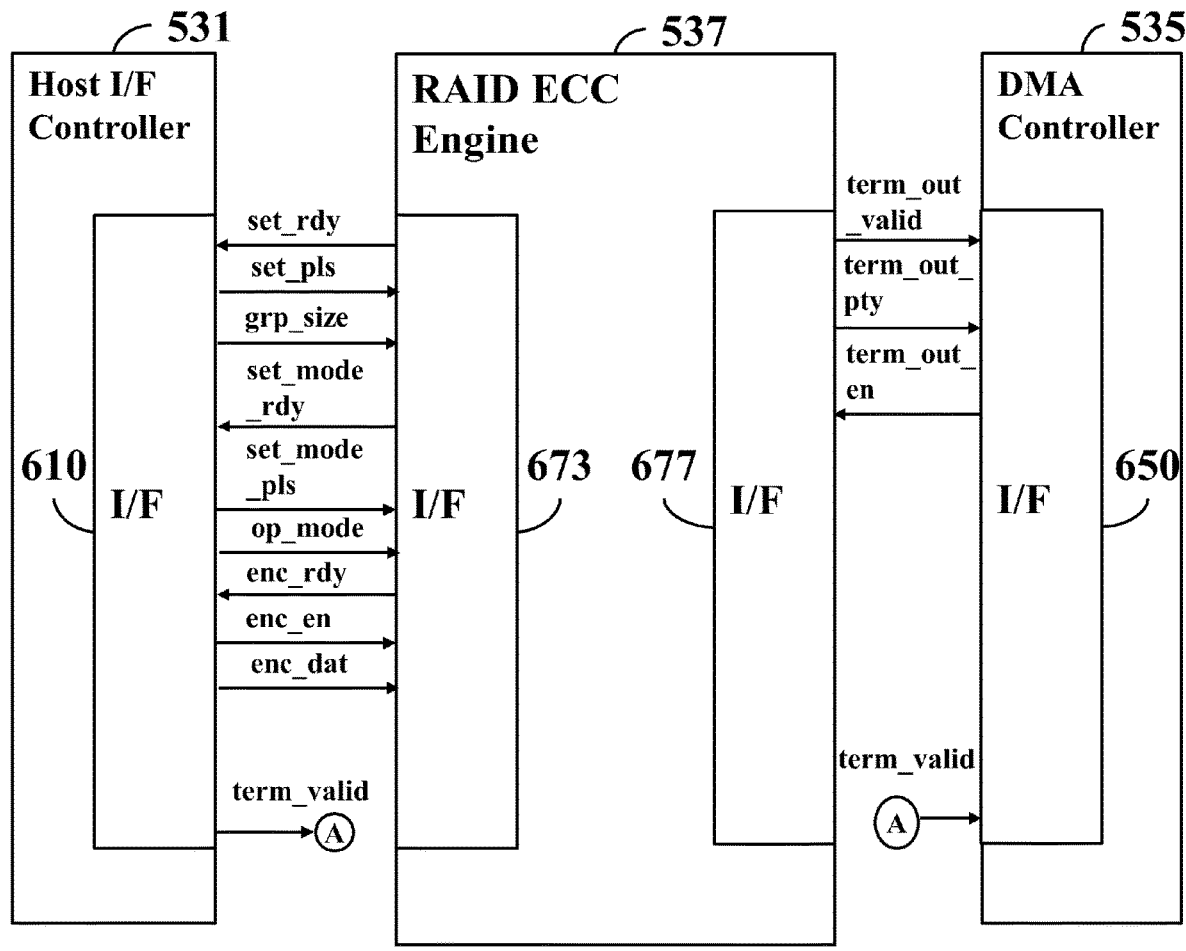
FIG. 6 is a schematic diagram illustrating interface interconnections for components of a flash controller according to an embodiment of the invention.
Figure 7:
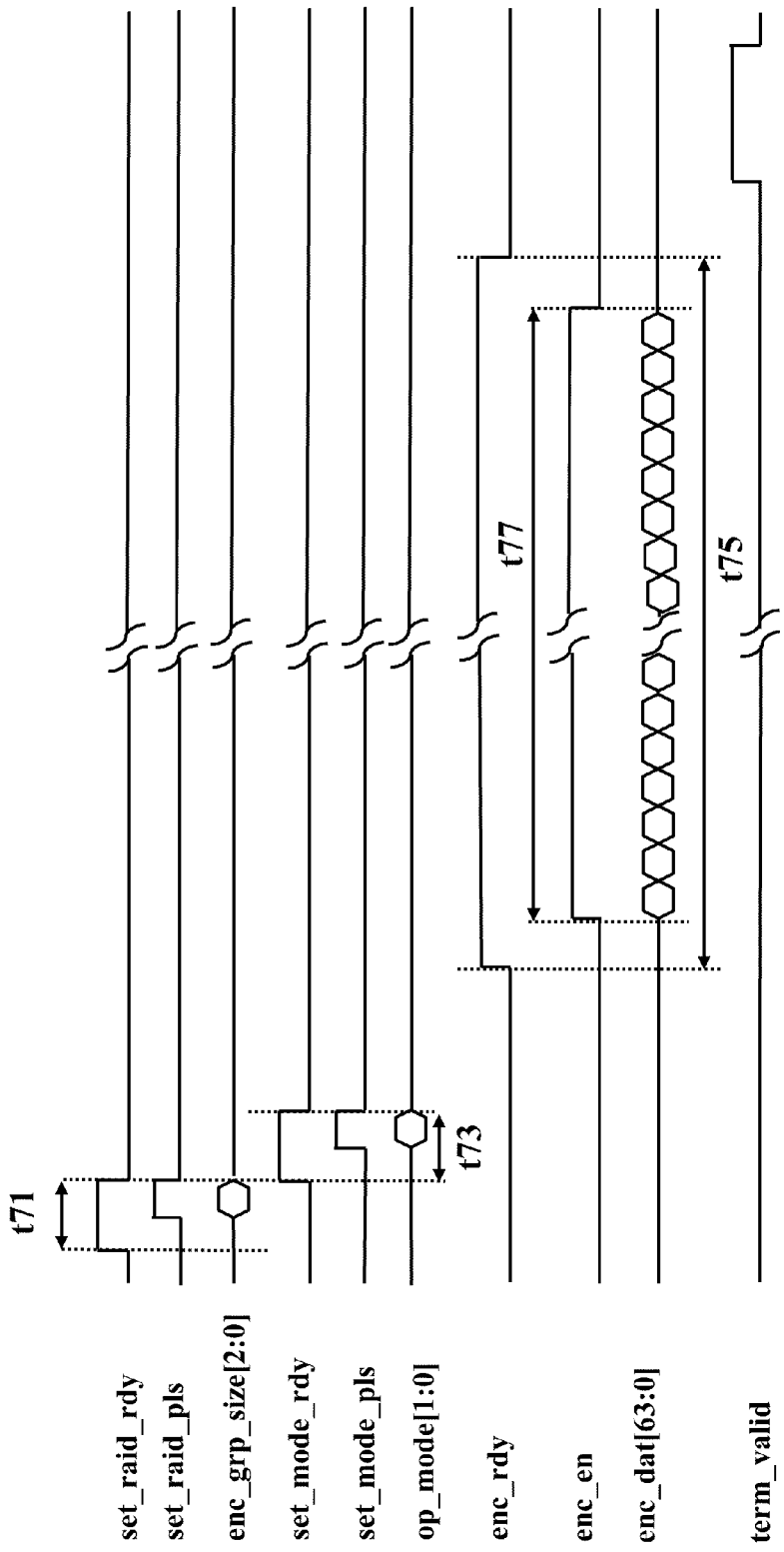
FIG. 7 is a timing diagram for transmitting user data on pages from a host interface (I/F) controller to a Redundant Array of Independent Disks (RAID) ECC engine according to an embodiment of the invention.

Refer to the schematic diagram illustrating interface interconnections as shown in FIG. 6. The RAID ECC engine 537 is equipped with an I/F 673 connected to an I/F 610 of the host I/F controller 531 for obtaining user data on each page of a page group directly from the host I/F controller 531 to encode parity bits of the page group, rather than obtaining that from the RAM 136 via any DMA controller. Before transmitting user data, the host I/F controller 531 may enter an initialization stage to inform the RAID ECC engine 537 of information indicating how many pages are included in one page group, an operation mode, etc. through the I/F 610. With references made to the timing diagram as shown in FIG. 7, specifically, for setting a page amount of one page group, the RAID ECC engine 537 may assert the Set RAID Ready signal "set_raid_rdy" for a time period t71 to notify the host I/F controller 531 that a page amount of one page group can be set during this time period t71. During the time period t71, the host I/F controller 531 may place a page amount of one page group on the Group Size data lines "grp size[2:0]" and generate a square wave on the Set RAID Pulse signal "set_raid_pls", so that the RAID ECC engine 537 fetches the page amount of one page group on the Group Size data lines at the rising edge of the square wave and stores the fetched one in an internal register. For setting an operation mode, the RAID ECC engine 537 may assert the Set Mode Ready signal "set_mode_rdy" for a time period t73 to notify the host I/F controller 531 that an operation mode can be set during this time period t73. During the time period t73, the host I/F controller 531 may place an operation mode (for example, mode=0) on the Operation Mode data lines "op mode[1:0]" and generate a square wave on the Set Mode Pulse signal "set_mode_pls", so that the RAID ECC engine 537 fetches the operation mode on the Operation Mode data lines at the rising edge of the square wave and stores the fetched one in an internal register.

After the initialization stage is completed, the RAID ECC engine 537 may assert the Encode Ready signal "enc_dry" until user data of one page group has been received completely (for example, the time period t75) to notify the host I/F controller 531 that user data can be transmitted in the asserted time period t75. The host I/F controller 531 may assert the Encode Enabling signal "enc_en" until user data on the last page has been transmitted completely (for example, the time period t77). During the time period t77, the host I/F controller 531 places user data on each page on the Encode data lines "enc_dat[63:0]" according to the clock signal (not shown in FIG. 7), so that the RAID ECC engines 537 fetches the user data thereon. The RAID ECC engine 537 may use Equation 1 or the like to calculate the fetched user data, so as to generate parity bits of a page group. The host I/F controller 531 may provide a transmission counter being initialized to 0. The transmission counter is increased by 1 after user data on one page has been transmitted completely. After the value of the transmission counter equals the page amount of one page group, the host I/F controller 531 may assert the Termination Valid signal "term valid" for a time period to notify the DMA controller 535 that parity bits of a page group can be obtained from the RAID ECC engine 537 and can be stored in a specified address of the RAM 136 through the bus architecture 132.

In the initialization stage, a controller (not shown in FIGS. 5 and 6) of the RAID ECC engine 537 may drive the interface 673 to assert the Set RAID Ready signal for a time period and assert the Set Mode Ready signal for a time period. A controller (not shown in FIGS. 5 and 6) of the host I/F controller 531 may drive the interface 610 to detect the Set RAID Ready signal, place a page amount of one page group on the Group Size data lines, generate a square wave on the Set RAID Pulse signal, detect the Set Mode Ready signal, place an operation mode on the Operation Mode data lines, and generate a square wave on the Set Mode Pulse signal.

In the data transmission stage, a controller (not shown in FIGS. 5 and 6) of the RAID ECC engine 537 may drive the I/F 673 to assert the Encode Ready signal for a time period.

A controller (not shown in FIGS. 5 and 6) of the host I/F controller 531 may drive the I/F 610 to assert the Encode Enabling signal for a time period, place user data on each page on the Encode data lines, and assert the Termination Valid signal for a time period.

It is to be understood that the host I/F controller 531 may be additionally equipped with a first I/F (not shown in FIGS. 5 and 6) connected to the host side 110, and a second I/F (not shown in FIGS. 5 and 6) connected to the bus architecture 132. A controller (not shown in FIGS. 5 and 6) of the host I/F controller 531 may drive the first I/F to obtain user data on each page from the host side 110 using a specific protocol, and drive the second I/F to gain the control of the bus architecture 132 to store user data on each page in a specified address of the RAM 136 through the bus architecture 132 using Advanced eXtensible Interface (AXI) protocol. Circuits, structures and functions of the controllers, the first I/F and the second I/F of the host I/F controller 531 are well known in the art, and are omitted herein for brevity.

Figure 8:
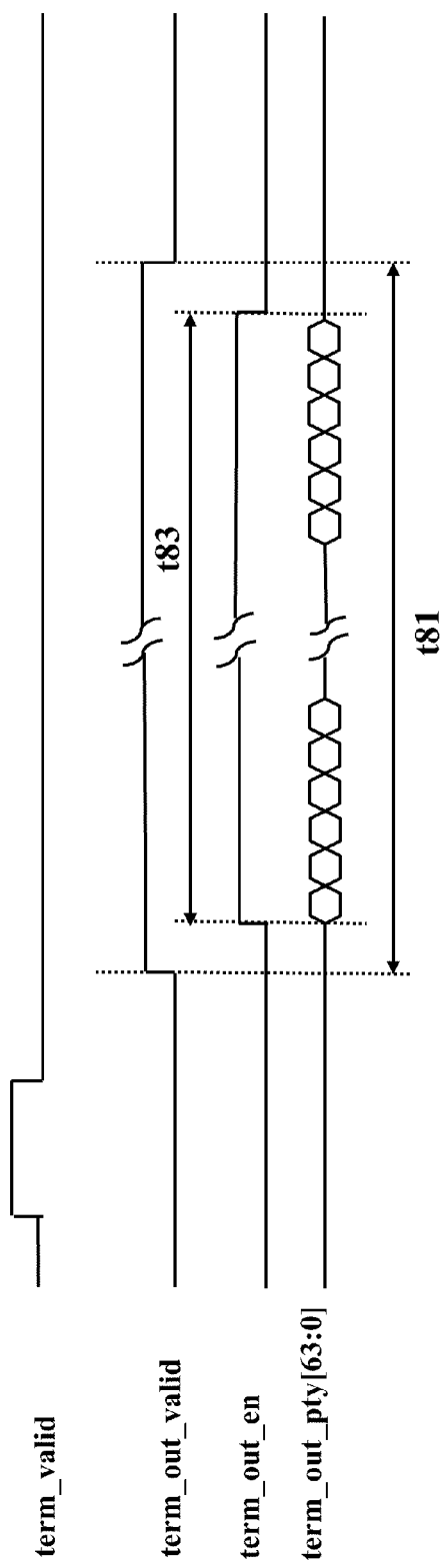
FIG. 8 is a timing diagram for transmitting parity bits of a page group from a RAID ECC engine to a Direct Memory Access (DMA) controller according to an embodiment of the invention.

Refer to the schematic diagram illustrating the interface connectivity as shown in FIG. 6. The RAID ECC engine 537 is equipped with an I/F 677 connected to an I/F 650 of the DMA controller 535 for outputting parities of page groups to the DMA controller. With references made to the timing diagram as shown in FIG. 8, specifically, after the DMA controller 535 receives the Termination Valid signal, the DMA controller 535 may assert the Termination Out Valid signal "term_out_valid" until parity bits of a page group have been received completely (for example, the time period t81) to notify the RAID ECC engine 537 that the parity bits of the page group can be transmitted during the asserted time period. The RAID ECC engine 537 may assert the Termination Out Enabling signal "term_out_en" until parity bits of the page group have been output completely (for example, the time period t83). During the time period t83, the RAID ECC engine 537 places the parity bits of the page group on the Termination Out Parity data lines "term_out_pty[63:0]" according to the clock signal (not shown in FIG. 8), so that the DMA controller 535 fetches the parity bits of the page group thereon.

In the parity transmission stage, a controller (not shown in FIGS. 5 and 6) of the DMA controller 535 may drive the interface 650 to detect the Termination Valid signal and assert the Termination Out Valid signal for a time period. A controller (not shown in FIGS. 5 and 6) of the RAID ECC engine 537 may drive the interface 677 to assert the Termination Out Enabling signal for a time period and place parity bits of a page group on the Termination Out Parity data lines.

It is to be understood that the DMA controller 535 may be additionally equipped with an I/F (not shown in FIGS. 5 and 6) connected to the bus architecture 132. A controller (not shown in FIGS. 5 and 6) of the DMA controller 535 may drive the I/F to gain the control of the bus architecture 132 to store parity bits of a page group in a specified address of the RAM 136 through the bus architecture 132 using AXI protocol. Circuits, structures and functions of the controller and the I/F of the DMA controller 535 are well known in the art, and are omitted herein for brevity.

Figure 9:
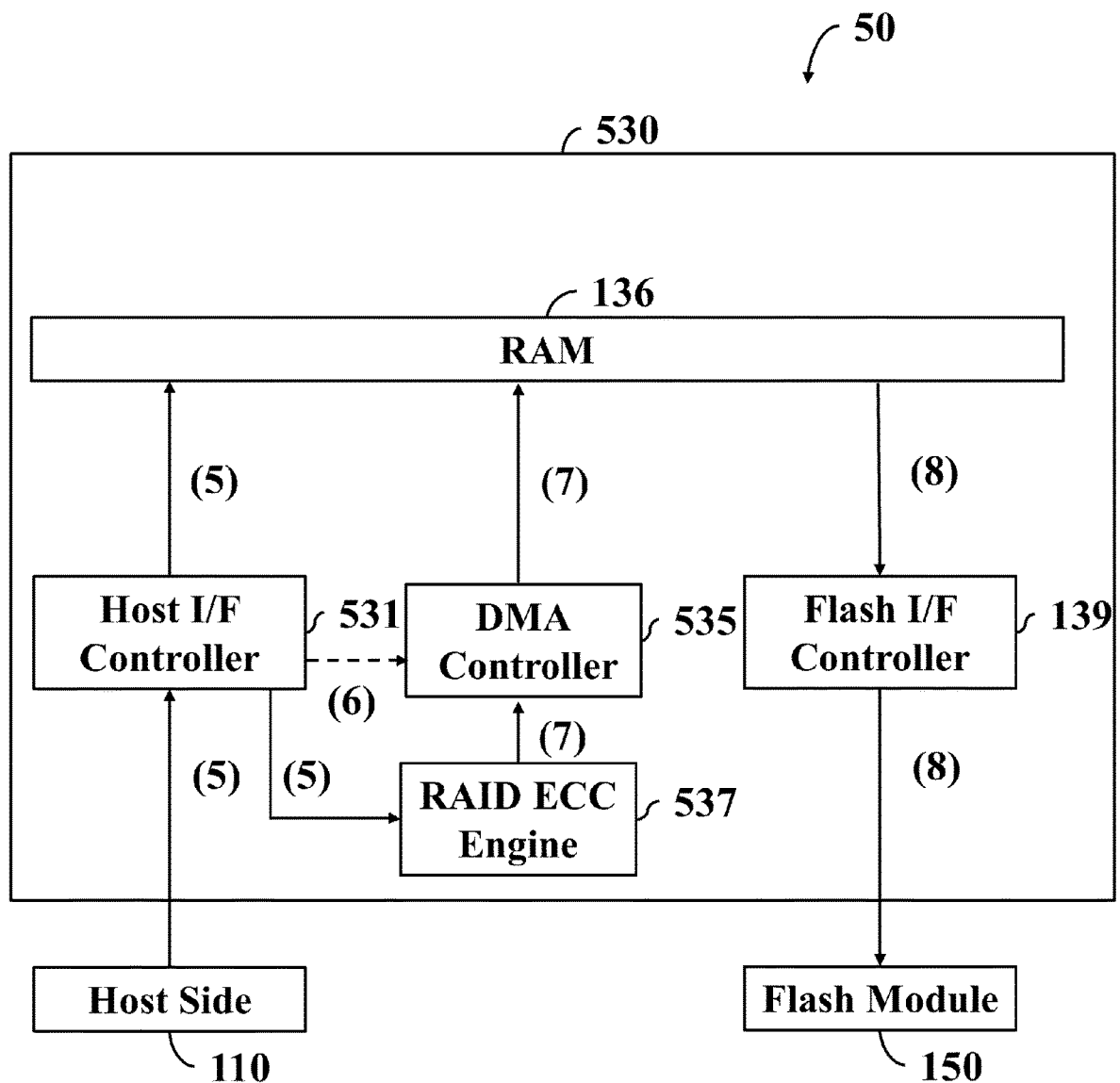
FIG. 9 is a schematic diagram for generating and programming user data and parity bits of a page group based on the system architecture as shown in FIG. 5.

Specifically, refer to the steps recited in FIG. 9 with references made to the architecture of the embodiments of the invention.

Step (5): The host I/F controller 531 obtains one page of user data from the host side 110, stores the user data on this page in a specified address of the RAM 136 through the bus architecture 132, and outputs the user data on this page to the RAID ECC engine 537 to encode via the I/F 610 simultaneously. Step (5) is repeatedly executed in the flash controller 530 until the user data of a page group is input to the RAID ECC engine 537 completely for calculation.

Step (6): The host I/F controller 531 issues the Termination Valid signal to the DMA controller 535 via the I/F 610 to notify the DMA controller 535 that parity bits of a page group can be obtained from the RAID ECC engine 537.

Step (7): The DMA controller 535 obtains the parity bits of the page group from the RAID ECC engine 537 via the I/F 650 and stores the obtained ones in a specified address of the RAM 136 via the bus architecture 132.

Step (8): The flash I/F controller 139 reads the user data on these pages and the parity bits of the page group from the specified addresses of the RAM 136 and programs the read ones into the flash module 150. The flash I/F controller 139 may additionally generate an ECC according to the user data on each page, and an ECC according to the parity of the page group, and program the ECC for each page and the ECC for the parity page into the flash module 150.

Comparing to the timing diagram corresponding to the previous implementations as shown in FIG. 4, with the new architecture according to the embodiments of the invention as shown in FIG. 5, it would save time and computation resources to perform read operations P #0(R) to P #6(R) with the previously implemented DMA controller 135 as shown in FIG. 2. Moreover, it would also avoid collisions between the other components and the DMA controller 535 as shown in FIG. 5 for contending the control of the bus architecture 132 to perform the read operations P #0(R) to P #6(R) as shown in FIG. 4, so that the other components would not spend time to wait for the read operations P #0(R) to P #6(R).

Although the embodiment has been described as having specific elements in FIGS. 5, 6, and 9, it should be noted that additional elements may be included to achieve better performance without departing from the spirit of the invention. Each element of FIGS. 5, 6, and 9 is composed of various circuits and arranged operably to perform the aforementioned operations. While the process flows described in FIG. 9 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for programming data of page groups into flash units, performed by a flash controller, comprising:

obtaining, by a host interface (I/F) controller, user data of a page group from a host side, wherein the page group comprises a plurality of pages;

storing, by the host I/F controller, the user data on the pages in a random access memory (RAM) through a bus architecture, outputting the user data on the pages to an engine via an I/F, and enabling the engine to calculate a parity of the page group according to the user data on the pages;

obtaining, by a direct memory access (DMA) controller, the parity of the page group from the engine and storing the parity of the page group in the RAM through the bus architecture; and obtaining, by a flash I/F controller, the user data on the pages and the parity of the page group from the RAM through the bus architecture, and programming the user data on the pages and the parity of the page group into a flash module.

2. The method of claim 1, wherein the host I/F controller does not output the user data on the pages to the engine through the bus architecture.

3. The method of claim 1, comprising:
gaining, by the host I/F controller, a control of the bus architecture to store the user data on each page in the RAM through the bus architecture.

4. The method of claim 1, comprising:
gaining, by the DMA controller, a control of the bus architecture to store the parity of the page group in the RAM through the bus architecture.

5. The method of claim 1, comprising:
after outputting the user data on the pages to the engine via the interface completely, issuing, by the host I/F controller, a termination valid signal to the DMA controller via the I/F to notify the DMA controller that the parity of the page group can be obtained from the engine.

6. The method of claim 1, comprising:
generating, by the flash I/F controller, a first error correcting code (ECC) according to the user data on each page, and a second ECC according to the parity of the page group; and
programming, by the flash I/F controller, the first ECCs on the pages, and the second ECC of the parity into the flash module.

7. The method of claim 1, wherein the engine applies XOR operations on the user data of the page group to generate the parity of the page group.

8. The method of claim 1, wherein the bus architecture is shared by the RAM, the host I/F controller, the DMA controller and the flash I/F controller to transfer data therebetween.

9. An apparatus for programming data of page groups into flash units, comprising:
a bus architecture;
an engine; and
a host interface (I/F) controller, comprising:
a first I/F, coupled to the bus architecture;
a second I/F, coupled to a host side;
a third I/F, coupled to the engine; and
a first controller, coupled to the first, the second and the third I/Fs,
wherein the first controller is arranged operably to drive the second I/F to obtain user data of a page group from the host side, which comprises a plurality of pages; and drive the first I/F to store the user data on the pages in a random access memory (RAM) through the bus architecture, drive the third I/F to output the user data on the pages to the engine, and enable the engine to calculate a parity of the page group according to the user data on the pages.

10. The apparatus of claim 9, wherein the host I/F controller is arranged operably to gain a control of the bus architecture to store the user data on each page in the RAM through the bus architecture.

11. The apparatus of claim 9, comprising:
a Direct Memory Access (DMA) controller, comprising:

a fourth I/F, coupled to the bus architecture;
a fifth I/F, coupled to the engine and the host I/F controller; and
a second controller,
wherein the second controller is arranged operably to drive the fifth I/F to obtain the parity of the page group from the engine; and drive the fourth I/F to store the parity of the page group in the RAM through the bus architecture.

12. The apparatus of claim 11, wherein the bus architecture is shared by the RAM, the host I/F controller and the DMA controller to transfer data therebetween.

13. The apparatus of claim 11, wherein the fourth I/F is arranged operably to gain a control of the bus architecture to store the parity of the page group in the RAM through the bus architecture.

14. The apparatus of claim 11, wherein the first controller is arranged operably to issue a termination valid signal to the DMA controller via the third I/F to notify the DMA controller that the parity of the page group can be obtained from the engine after outputting the user data on the pages to the engine via the third I/F completely.

15. The apparatus of claim 14, wherein the host I/F controller is arranged operably to provide a transmission counter being initialized to 0, increase the transmission counter by 1 after user data on one page has been transmitted completely, and the first controller is arranged operably to issue the termination valid signal to the DMA controller via the third I/F after a value of the transmission counter equals an page amount of the page group.

16. The apparatus of claim 11, comprising:
a flash I/F controller, coupled to the bus architecture, arranged operably to obtain the user data on the pages and the parity of the page group from the RAM through the bus architecture; and program the user data on the pages and the parity of the page group into a flash module.

17. The apparatus of claim 16, wherein the flash I/F controller is arranged operably to generate a first error correcting code (ECC) according to the user data on each page; generate a second ECC according to the parity of the page group; and program the first ECCs on the pages, and the second ECC of the parity into the flash module.

18. The apparatus of claim 16, wherein the bus architecture is shared by the RAM, the host I/F controller and the flash I/F controller to transfer data therebetween.

19. The apparatus of claim 9, wherein the engine does not obtain the user data on the pages through the bus architecture.

20. The apparatus of claim 9, wherein the engine is arranged operably to apply XOR operations on the user data of the page group to generate the parity of the page group.

* * * * *